United States Patent [19]

Stone

[11] Patent Number: 4,626,348

[45] Date of Patent: Dec. 2, 1986

[54] END CAP WHICH WILL ACCOMMODATE FLOW REVERSAL

[75] Inventor: Walter H. Stone, Modesto, Calif.

[73] Assignee: Parker-Hannifin Corporation, Cleveland, Ohio

[21] Appl. No.: 626,031

[22] Filed: Jun. 29, 1984

[51] Int. Cl.$^4$ .............................................. B01D 36/02
[52] U.S. Cl. .................................. 210/248; 210/303; 210/312; 210/315
[58] Field of Search ............... 210/232, 238, 242, 300, 210/301, 311, 313, 315, DIG. 5, 108, 416.1, 416.4, 437, 438, 441, 442, 445, 450, 451, 452, 453, 411, 412, 427, 248, 303, 312; 123/196 A, 196 R

[56] References Cited

U.S. PATENT DOCUMENTS

| | | | |
|---|---|---|---|
| 2,524,336 | 10/1950 | Vokes | 210/187 |
| 2,651,414 | 9/1953 | Lawson | 210/DIG. 5 |
| 3,228,527 | 1/1966 | McPherson | 210/DIG. 5 |
| 3,312,351 | 4/1967 | Kasten | 210/307 |
| 3,508,658 | 4/1970 | McVay | 210/114 |
| 3,726,403 | 4/1973 | Shaltis | 210/132 |
| 3,859,216 | 1/1975 | Sisson et al. | 210/440 |
| 4,253,954 | 3/1981 | Midkiff et al. | 210/DIG. 5 |
| 4,292,179 | 9/1981 | Stone et al. | 210/443 |
| 4,502,955 | 3/1985 | Schaupp | 210/149 |
| 4,502,956 | 3/1985 | Wilson et al. | 210/248 |

Primary Examiner—Richard V. Fisher
Assistant Examiner—Wanda L. Millard
Attorney, Agent, or Firm—Kerkam, Stowell, Kondracki, & Clarke

[57] ABSTRACT

A filter unit uses an end cap design to allow flow reversal from inside-out or outside-in and accommodates a dual collection zone or sump collection bowl. The spin-on filter unit has relieved portions on the end cap to define contaminant channels such that the space between an annular filter media and the filter unit housing is connected to one of the sumps. The contaminant channels allow for prefiltering contaminant removal when the filter connected for radially inward flow and allows for post filtering contaminant removal when the filter unit is connected for radially outward fuel flow.

23 Claims, 7 Drawing Figures

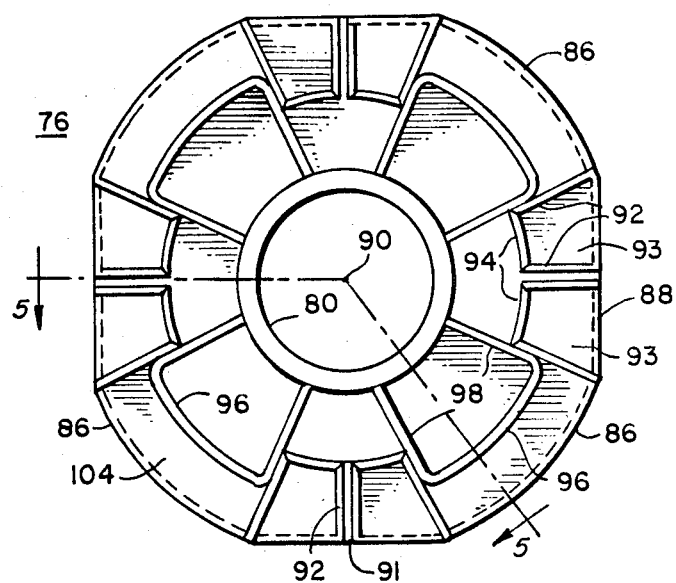
FIG. 4.
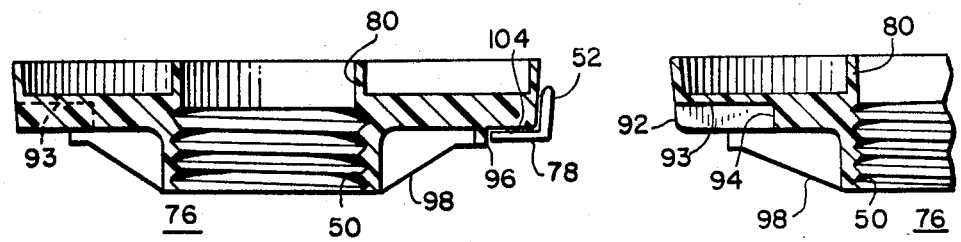
FIG. 5.
FIG. 7.
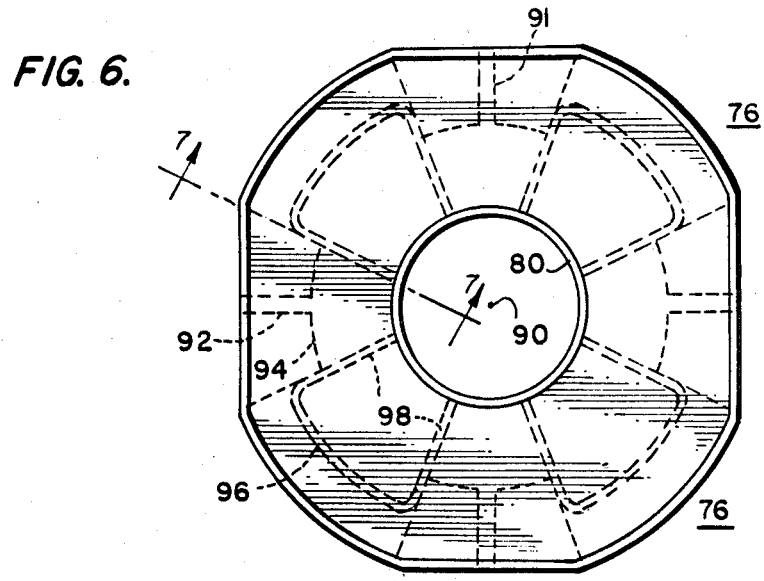
FIG. 6.

END CAP WHICH WILL ACCOMMODATE FLOW REVERSAL

BACKGROUND OF THE INVENTION

This invention relates to fuel filter/separators. More specifically, this invention relates to fuel filter/separators and an associated end cap design which will accommodate fuel flow in different directions.

As used herein, "fuel filter", "filter unit", and "filter media" shall include devices which separate liquid contaminants from fuel, commonly referred to as separators, in addition to devices for removing particulate contaminants from fuel.

The use of fuel filters for separating contaminants from fuel is well known in the art. Many filters are of the spin-on type and may conveniently be screwed onto a head or an engine block which simply supply fuel to the filter and allow fuel to exit from the filter unit. Typically, the filters are cylindrical and include annular or cylindrical filter media within the unit. Commonly, the cylindrical filter media is disposed within a metallic casing and is supported by a end cap which may be made of plastic.

At least some prior art filter unit designs have included provisions for a prefiltering contaminant collection zone or sump. Such a sump is used to collect especially heavy contaminants which may drop out of the fuel prior to its passage through the filter media. Such prefiltering contaminant collection zones or sumps are advantageous in prolonging the life of the filter. Additionally, such sumps are used for collecting water or other liquid contaminants which are separated from the fuel by barrier filters. Alternately, some designs use a collection sump for coalesced water on the downstream side of a coalescing filter media.

Traditionally, the majority of spin-on filters have used an outside-in flow through the annular or cylindrical filter media. This provides the maximum surface area such that particulate matter will not clog the filter as easily as with a reduced surface area such as radially outward flow.

In contrast to the radially inward flow of the filters for particulate matter, coalescing filters have generally used flow from the interior of the cylindrical filter to flow radially outward. The radially outward flow causes a decrease in velocity which tends to aid the coalescing action of the coalescing filter media.

Regardless of whether a spin-on filter unit uses radially outward flow or radially inward flow, it is screwed onto the head or engine block which supplies fuel to the fuel inlet port or ports on the filter unit and which receives fuel from the fuel outlet port or ports on the filter unit. Because the head is arranged for either radially inward flow or radially outward flow, the filter unit screwed into the head must be compatible with it.

Compatibility between a filter unit and the head in which it is to be screwed to is especially important if the filter unit includes a sump for the purposes described above. Obviously, if the sump is designed to be a prefiltering sump and the fuel flow is reversed, the sump will no longer function in its intended fashion.

The present inventor was a coinventor with William G. Nostrand of an invention which allows a coalescer using radially outward flow to be connected to a head or engine block which is designed for radially inward flow. That invention, which is described in detail in U.S. Pat. No. 4,292,179 issued on Sept. 29, 1981 and entitled "Spin-On Filter Coalescer Unit With Flow Reversing Baffle Assembly", uses a flow reversing baffle assembly to allow a radially outward flow filter to be used in a head or engine block constructed to supply fuel to a radially inward flow filter.

Previous U.S. patents further include the following:

| U.S. Pat. No. | Inventor | Issue Date |
|---|---|---|
| 3,228,527 | McPherson | Jan. 11, 1966 |
| 3,312,351 | Kasten | April 4, 1967 |
| 3,726,403 | Shaltis | April 10, 1973 |
| 3,859,216 | Sisson et al. | Jan. 7, 1975 |

The McPherson patent shows a water separating fuel filter having an embodiment for radially outward flow of the fuel with outlets to a single collection sump and an alternate radially inward flow embodiment having outlets for passing contaminants into a collection zone or sump.

The Kasten patent shows a fuel filter/separator with radially outward flow and a single sump which receives coalesced water from the outside layer of a filter media.

The Shaltis patent shows a spin-on fuel filter having dual flow paths such that the fuel initially passes radially outward from an annular filter media. Some of the fuel flows down and up a lower contaminant collection area whereas the rest of the fuel flows radially inward.

The Sisson et al. patent discloses a filter assembly having radially inward fluid flow and a single contaminant collection zone. A relief valve is two-way to permit fluid flow in either direction depending upon the direction of fluid flow through the element.

The use of a dual collection zone or sump arrangement with a spin-on filter is disclosed in U.S. patent application No. 568,271 filed by Wilson et al. on Jan. 3, 1984 under the title "Filter Assembly", now U.S. Pat. No. 4,502,956 issued on Mar. 5, 1985. That application, which is a continuation of application Ser. No. 351,761 filed on Feb. 24, 1982, now abandoned, is assigned to the assignee of the present invention and is hereby incorporated by reference. The Wilson et al filter design includes an inner and an outer cylindrical filter media. A central contaminant collection zone or sump is adapted to receive contaminants prior to fuel passage through the inner filter media, whereas an annular contaminant collection zone or sump is adapted to receive contaminants after the fuel has passed through the coalescing inner filter media.

Although the previous filter designs have been generally useful, their flexibility in use has been limited. Likewise, the end caps used for such filter designs have been limited in flexibility.

OBJECTS AND SUMMARY OF THE INVENTION

An object of the present invention is to provide a new and improved fuel filter unit.

A further object of the present invention is to provide a new and improved fuel filter end cap.

A still further object of the present invention is to provide a fuel filter unit and end cap which will accommodate fuel flow reversal.

Another object of the present invention is to provide a fuel filter unit and end cap which accommodate primary and secondary sumps for fuel flow in either direction.

Yet another object of the present invention is to provide a fuel filter unit and end cap which may be used with a dual sump collection bowl.

The above and other objects of the present invention which will become more apparent as the description proceeds are realized by an invention comprising a fuel filter unit including: a casing having first and second fuel ports to define a fuel flow path through the filter unit; a first filter media disposed in a closed loop within the casing and separating a central fuel chamber from a peripheral fuel chamber, the peripheral fuel chamber disposed directly between the first filter media and the casing, the first filter media disposed intermediate the first and second fuel ports in the fuel flow path; a peripheral contaminant outlet operable to allow contaminants to directly exit from the peripheral fuel chamber by way of at least one inwardly extending contaminant channel; and a central contaminant outlet operable to allow contaminants to directly exit from the central fuel chamber. The filter unit further includes an end cap, and the inwardly extending contaminant channel is in the end cap. The casing includes a sidewall and a bottom and the contaminant channel extends between the end cap and the sidewall and between the end cap and the bottom. The casing is cylindrical, the end cap includes cylindrical peripheral portions conforming to the casing and recessed portions recessed from the casing, and each recessed portion is part of a contaminant channel extending to a corresponding peripheral contaminant outlet. The invention further comprises a contaminant collection bowl supported by the filter unit and releasably engaged to the filter unit, the collection bowl having separate first and second collection zones, the first collection zone disposed to collect liquid contaminants from the peripheral contaminant outlet as fuel passes through the filter unit, and the second collection zone is disposed to collect liquid contaminants from the central contaminant outlet as fuel passes through the filter unit. In operation, the first and second collection zones are completely walled off from each other with the only communication between the first and second collection zones being through the filter unit by way of the central contaminant outlet and the first filter media. The fuel flow path includes radially inward flow of fuel through the first filter media and the peripheral contaminant outlet provides prefiltering contaminant removal. The first filter media is a coalescing media and the invention may further comprise a second filter media inside the central fuel chamber and the second filter media is a barrier media. The filter unit is operable to provide prefiltering contaminant removal for inside out flow and outside in flow.

The present invention may alternately be described as comprising a fuel filter unit including: a casing having first and second fuel ports to define a radially inward fuel flow path through the filter unit; a first filter media disposed in a closed loop within the casing and separating a central fuel chamber from a peripheral fuel chamber, the peripheral chamber disposed directly between the first filter media and the casing, the first filter media disposed intermediate the first and second fuel ports in the fuel flow path, the fuel flow path including radially inward flow of fuel through the first filter media; a peripheral contaminant outlet operable to allow prefiltering removal of contaminants directly from the peripheral fuel chamber; and a central contaminant outlet operable to allow contaminants to directly drain from the central fuel chamber. The filter unit further comprises an end cap having a contaminant channel therethrough, the contaminant channel connecting the peripheral fuel chamber to the peripheral contaminant outlet. The filter unit further includes a plurality of contaminant channels and associated peripheral contaminant outlets. Each of the inwardly extending contaminant channels is in the end cap.

The present invention alternately comprises a fuel filter end cap having a central contaminant outlet and at least one contaminant channel extending radially inward from a periphery of the end cap, the end cap adapted for securing a first filter media disposed in a closed loop within a casing such that the central contaminant outlet may pass contaminants within the first filter media and the contaminant channel may pass contaminants from outside of the first filter media, the end cap being operable to provide prefiltering contaminant drainage for inside-out fuel flow and outside-in fuel flow. The end cap comprises a plurality of like-constructed contaminant channels extending radially inward from the periphery of the end cap. The end cap has cylindrical peripheral portions of a common radius centered at the center of the central contaminant outlet and recessed portions in between adjacent cylindrical peripheral portions, the recessed portions being closer to the center than the cylindrical portions are. The end cap further includes relieved portions on a lower surface, the relieved portions constituting part of the contaminant channels. The end cap is part of a fuel filter unit also including a casing having first and second fuel ports to define a fuel flow path through the filter unit and a first filter media disposed in a closed loop within the casing and separating a central fuel chamber from a peripheral fuel chamber, the peripheral fuel chamber disposed directly between the first filter media and the casing, the first filter media disposed intermediate the first and second fuel ports in the fuel flow path, and a plurality of peripheral contaminant outlets operable to allow contaminants to directly exit from the peripheral fuel chamber by way of the contaminant channels.

BRIEF DESCRIPTION OF THE DRAWINGS

The above and other features of the present invention will be more easily understood by considering the following detailed description in conjunction with the accompanying drawings wherein like characters represent like parts throughout the several views and in which:

FIG. 4 shows a bottom view of an end cap according to the present invention.

FIG. 5 shows a cross-sectional view taken along lines 5—5 of FIG. 4.

FIG. 6 shows a top view of the end cap.

FIG. 7 shows a cross-sectional view taken along lines 7—7 of FIG. 6.

DETAILED DESCRIPTION

Figure 1:
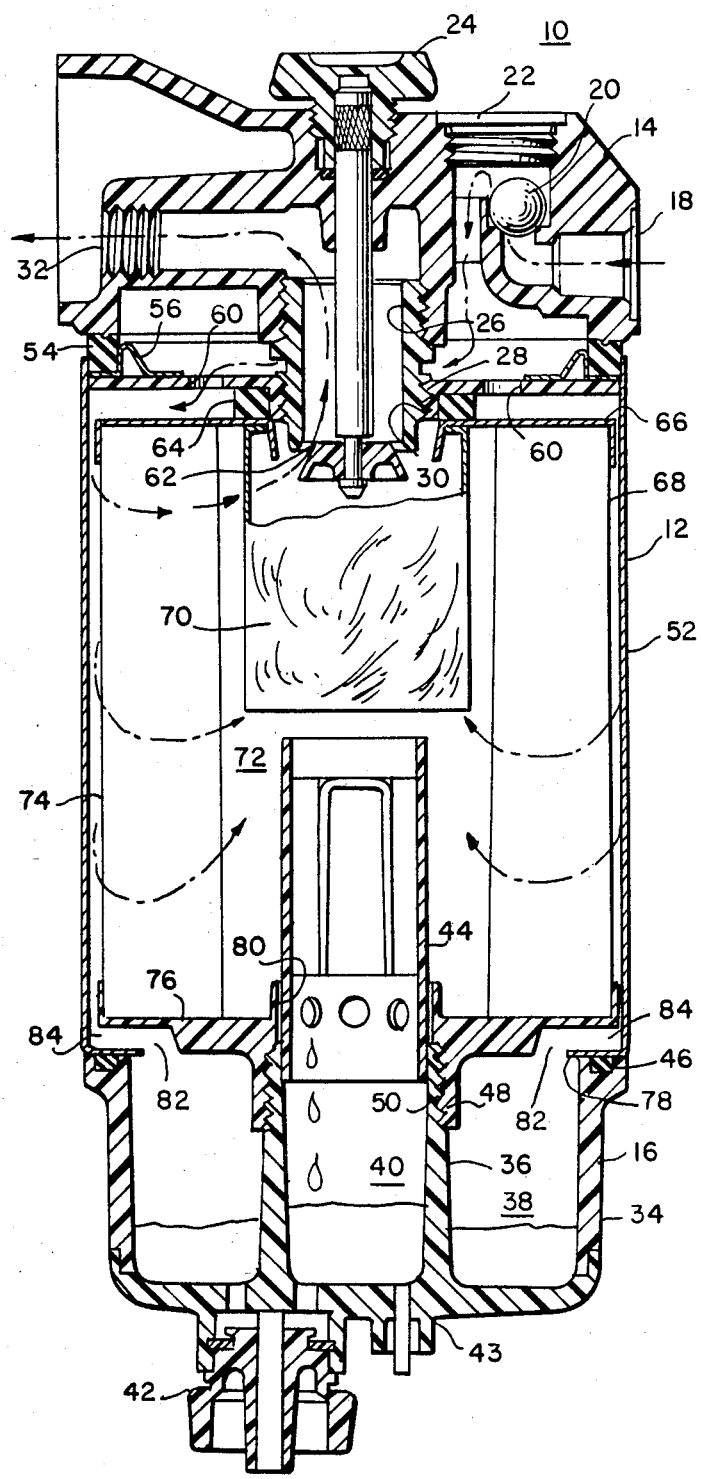
FIG. 1 shows a cross-sectional view of a filter assembly according to the present invention.

Turning now to FIG. 1, a filter assembly 10 according to the present invention is shown in cross section. The filter assembly 10 includes a filter unit 12 threaded onto a head 14. A contaminant collection bowl 16 is in turn screwed onto the bottom of the filter unit 12.

The head 14 and collection bowl 16 are substantially identical in operation to the head and collection bowl of FIG. 4 of the above-identified Wilson et al. patent. Accordingly, these components will be only briefly discussed.

The head 14 includes a fuel entrance 18 and a ball check valve 20 which prevents back flow of the fuel out the fuel entrance 18. A screw in plug 22 may be used for obtaining access to the ball check valve 20. A manually operable primer 24 is disposed within the head 14 and extends within a cylinder 26 having external threads 28 for attachment to the centrally-located internal threads 30 of the filter unit 12. The head 14 further includes a fuel exit 32 for conveying filtered fuel out of the head 14, the filtered fuel being passed upwardly from the filter unit 12 through the cylinder 26.

The collection bowl 16 includes an outer cylindrical wall 34 and an inner cylindrical wall 36 having a peripheral contaminant collection zone 38 extending between the inner and outer cylindrical walls. A central contaminant collection zone or sump 40 is disposed within the inner cylindrical wall 36 which is coaxial to the outer cylindrical wall 34. A drain arrangement 42 may be used to simultaneously drain the peripheral contaminant zone 38 and the central contaminant sump 40 as with the incorporated by reference Wilson et al. patent. An optional heater 44 may advantageously be mounted upon the inner cylindrical wall 36 to extend up into the filter unit 12, the heater described in more detail in the Schaupp patent application U.S. Ser. No. 484,904 entitled "Filter Assembly" filed on Apr. 14, 1983, now U.S. Pat. No. 4,502,955, issued on Mar. 5, 1985. Part 43, shown schematically, may be used to connect electrical wires to the heater 44. The Schaupp patent application is hereby incorporated by reference.

The collection bowl 16 further includes a gasket 46 on the outer wall 34 and external threads 48 on the inner cylindrical wall 36 to allow the collection bowl 16 to be screwed to the internal threads 50 of the filter unit 12. Alternately, threads could be disposed on the outer wall 34 inside the gasket 46 and an O-ring could be used as a seal on the inner wall 36. If desired, an optional level sensor may be included in the collection bowl 16 in similar fashion to that disclosed for the Wilson et al. patent.

Figure 2:
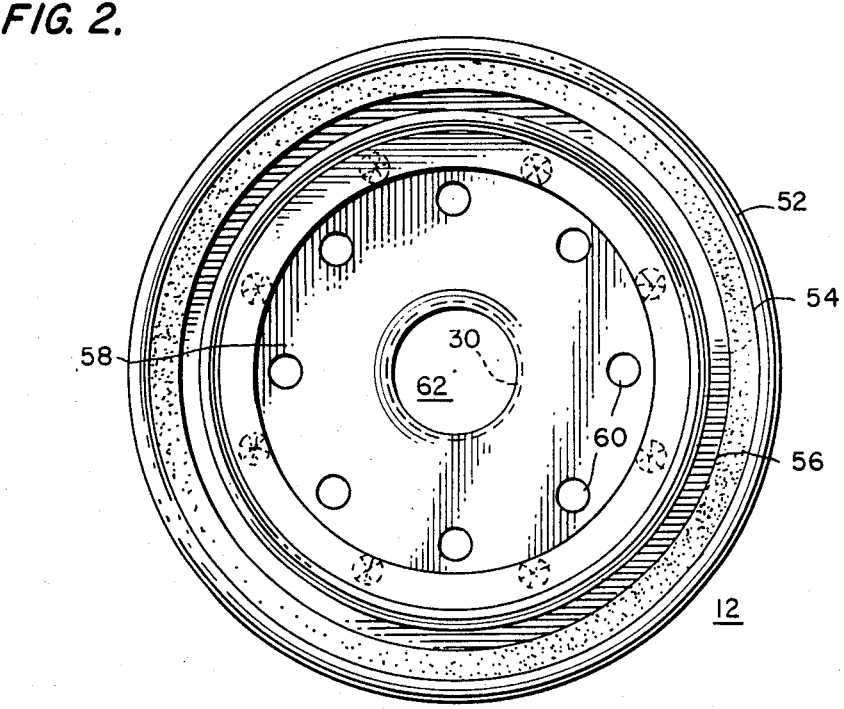
FIG. 2 shows a top view of the filter unit of the present invention.

Continuing to view FIG. 1, but also considering the views of FIGS. 2 and 3 which respectively show top and bottom views of the filter unit 12 of the present invention, the construction of the filter unit 12 will be discussed in detail. The filter unit 12 includes a cylindrical housing 52, which may for example be made of metal. A gasket 54 is used to seal the interface between the filter unit 12 and the head 14. The gasket 54 is seated by a ring piece 56 mounted to a disc piece 58 having a plurality of circumferentially arranged fuel ports 60 disposed therein. Further, the disc piece 58 has the internal threads 30 which mate to the external threads 28 on the cylinder 26 of the head 14. The space within the internal threads 30 and within the cylinder 26 may be considered as a central fuel port 62. A gasket 64 is used to separate the central fuel port 62 from the peripheral fuel ports 60. An upper piece 66 is spaced from the disc piece 58 by the gasket 64. An annular or cylindrical filter media 68 extends downwardly from the piece 66, whereas an optional second or inner filter media 70 may also extend downward from the upper piece 66. As shown, the inner filter media 70 may be a bag or sock or pleated medium.

Although the present invention is susceptible to various types of filter media, it is preferred that the outer annular filter media 68 is a coalescing media, whereas the sock or inner media 70 is a barrier-type filter.

The annular or cylindrical media 68 divides the interior of the housing 52 into a central fuel chamber 72 disposed within the filter media 68 and a peripheral fuel chamber 74 disposed directly (i.e., no intervening filters) between the annular filter 68 and the cylindrical housing 52.

Disposed at the lower end of the annular filter media 68 is an end cap 76. The end cap 76 supports the filter media 68 within the cylindrical housing 52 which includes a bottom portion 78.

Before proceeding to discuss the more specific details of the end cap 76 of the present invention, it will be useful to briefly summarize its operation especially with reference to FIG. 1. The end cap 76 includes central contaminant outlet 80 and a plurality of peripheral contaminant outlets 82 which respectively allow contaminants in the central fuel chamber 72 and the peripheral fuel chamber 74 to fall into the respective central contaminant collection zone 40 and peripheral or annular contaminant collection zone 38. The peripheral contaminant outlets 82 communicate with the annular peripheral fuel chamber 74 by way of contaminant channels 84 between the end cap 76 and the cylindrical sidewalls and bottom 78 of the housing 52. Note that the contaminant zones or sumps 38 and 40 are completely walled off from each other such that they can communicate only by way of the filter unit 12 through outlets 80 and 82 and through filter media 68.

Continuing to consider FIGS. 1 and 3, but also considering the views of FIGS. 4–7, the specific details of the construction of the end cap 76 will be described. FIG. 4 shows a bottom view of the end cap 76, whereas FIG. 5 shows a cross-section taken along lines 5—5 of FIG. 4. FIG. 6 shows a top view of the end cap 76, whereas FIG. 7 shows a cross-section view along lines 7—7 of FIG. 6. Initially, with reference to FIGS. 3, 4, and 6 it is noted that the filter unit 12 and associated end cap 76 include 4 identically constructed quarters with identical parts in each of the quarters. Accordingly, ease of illustration dictates that not all of the identically constructed parts be labeled.

The end cap 76 includes 4 cylindrical peripheral portions 86 which conform to the casing 52. Specifically, the outer cylindrical peripheral portions 86 have an outside diameter just less than the inside diameter of the cylindrical walls of housing 52 as best illustrated on the left side of FIG. 3 with part of the bottom 78 broken away. As illustrated at the upper left of FIG. 3, the interior wall of the casing 52 in fact abutts and contacts the cylindrical peripheral portions 86. Disposed in between adjacent cylindrical peripheral portions 86 are recessed portions or sectors 88 which are closer to the center 90 of the end cap 76 than are the cylindrical peripheral portions 86. Each recessed portion or sector 88 includes two relieved portions 93 defined within the tapered radial boundaries 92 and the tapered arcuate boundaries 94. The center of curvature of the arcuate boundaries 94 is the center 90.

Each of the outer cylindrical peripheral portions 86 includes a scallop like structure of two radial ridges 98 with an arcuate ridge 96 extending therebetween. As shown in FIGS. 5 and 7, the radial ridges 98 are tapered up and out to the arcuate ridges 96.

Figure 3:
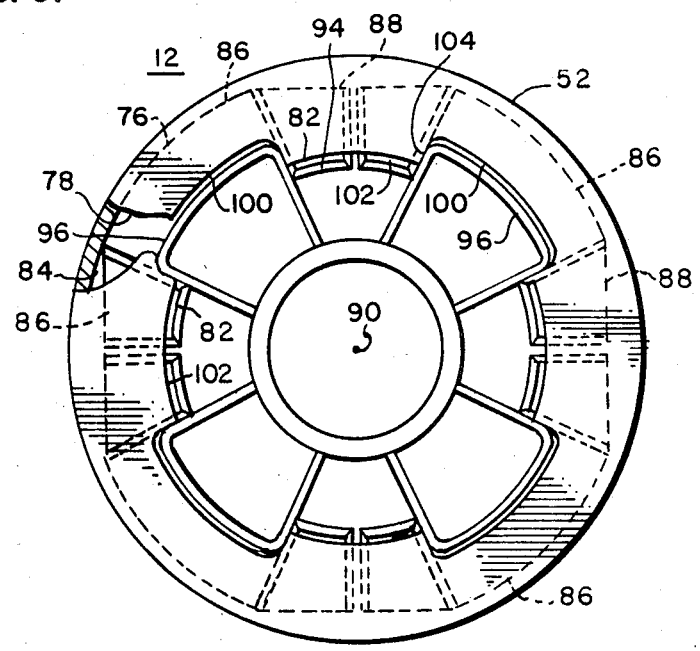
FIG. 3 shows a bottom view of the filter unit of the present invention.

As illustrated in FIG. 3, the bottom 78 of the casing 52 extends to cylindrical edges 100 which abut the corresponding arcuate ridges 96 and inner cylindrical edges 102 corresponding to the recessed portions 88. The peripheral contaminant outlets 82 are disposed between the inner cylindrical edge 102 of the bottom 78 and the inner arcuate boundary 94 of the relieved portions 93 of the end cap 76. The cylindrical edges 100 of the bottom 78 are connected to the inner cylindrical edges 102 of the bottom 78 by radial edges 104 which extend parallel to corresponding radial ridges 98, thereby preventing the end cap 76 from rotating relative to the housing 52. The surfaces 104 in each of the sectors corresponding to the outer cylindrical peripheral portions 86 are disposed just outside of the arcuate ridges 96 and are just above the bottom 78 of housing 52 as best illustrated on the right side of FIG. 5 which includes a small broken away portion of the cylindrical housing 52. Ridges 91 between adjacent relieved portions 93 are at the same level as the surfaces 104 and therefore simply serve as supports to offset the relieved portions 93 from the bottom 78 of metallic housing 52. In the absence of such radial ridges 91, high pressure might otherwise cause the relieved portions 93 to be pressed downwardly towards the metallic bottom 78 of the metallic casing 52.

In radially inward operation, fuel enters into the filter unit 12 by way of the peripheral fuel ports 60 whereupon it proceeds to the peripheral fuel chamber 74. Some of the heavier particulate matter and/or larger drops of water will proceed directly (i.e., no intervening filter) out the peripheral contaminant outlets 82 by way of the contaminant channels 84 which are realized by the spacing between the portions 88 of the end cap 76 and the inner cylindrical wall of the housing 52 (see especially the broken-away portion on FIG. 3) and by the relieved portions 93 which extend radially inward (i.e., meaning that the channels 84 have a radial component) past the inner cylindrical edges 102 of the bottom 78. As apparent, the contaminant channels 84 extend inwardly towards the central contaminant outlet centered about axis 90. Such contaminants may drop into the outer contaminant collection zone 38. The fuel from the annular or peripheral fuel chamber 78 may proceed radially inward through the filter media 68 which may filter particulate matter and/or coalesce water. Coalesced water and/or other contaminants in the fuel entering into the central fuel chamber 72 may proceed out of the central contaminant outlet 80 into the central contaminant collection zone 40. The water and/or other contaminants may proceed out from the central fuel chamber 72 either before or after contact with the barrier media 70 which optionally may be included. The filtered fuel may then proceed up the cylinder 26 and out the fuel exit 32.

It should be appreciated that the highly advantageous arrangement of the present invention allows for prefiltering sumps or collection zones for either radially inward flow or radially outward flow. For example, leaving out the optional barrier filter media 70, the filter unit 12 may easily and readily work for both radially inward flow or radially outward flow. The highly advantageous end cap 76 of the present invention specifically allows for such flow reversal. Further, the end cap 76 allows the annular or peripheral fuel chamber 74 between the filter media 68 and the cylindrical housing 52 to be connected into the peripheral contaminant zone 38 of the collection bowl 16. The end cap 76 is not only advantageous in its application to a filter adapted for radially in and radially out flow, but the end cap 76 is highly advantageous in it may be used for either type of fuel filter. That is, even if separate filters are designed specifically for radially inward flow and radially outward flow, the same end cap 76 may be used with either filter. In other words, a manufacturer producing both radially inward flow filters and radially outward flow filters may use a common end cap 76 for either design.

Although the present invention has been described with reference to particular constructions and structures, it will be readily understood that these are for illustrative purposes only. Various modifications and adaptations will be readily apparent to those of ordinary skill in the art. Accordingly, the scope of the present invention should be determined by reference to the claims appended hereto.

What is claimed is:

1. An invention comprising a fuel filter unit including:
  (a) a casing having first and second fuel ports to define a fuel flow path through said filter unit;
  (b) a first filter media disposed in a closed loop within said casing and separating a central fuel chamber from a peripheral fuel chamber, said peripheral fuel chamber disposed directly between said first filter media and said casing, said first filter media disposed intermediate said first and second fuel ports in said fuel flow path;
  (c) a peripheral contaminant outlet operable to allow contaminants to directly exit from said peripheral fuel chamber by way of at least one contaminant channel; and
  (d) a central contaminant outlet operable to allow contaminants to directly exit from said central fuel chamber, and wherein said filter unit includes an end cap, said contaminant channel is radially inwardly extending from said casing towards said central contaminant outlet, said casing includes a side wall, and said end cap includes a peripheral portion contacting said side wall of said casing and a recessed portion recessed from said side wall of said casing, and said recessed portion is part of said contaminant channel.

2. The invention of claim 1 further comprising a contaminant collection bowl supported by said filter unit and releasably engaged to said filter unit, said collection bowl having separate first and second collection zones, said first collection zone disposed to collect liquid contaminants from said peripheral contaminant outlet as fuel passes through said filter unit, and said second collection zone disposed to collect liquid contaminants from said central contaminant outlet as fuel passes through said filter unit.

3. The invention of claim 2 wherein, in operation, said first and second collection zones are completely walled off from each other with the only communication between said first and second collection zones being through said filter unit by way of said central contaminant outlet and said first filter media.

4. The invention of claim 3 wherein said casing includes a bottom, and said contaminant channel extends between said end cap and said bottom.

5. The invention of claim 4 wherein said casing is cylindrical, said end cap includes a plurality of peripheral portions which are cylindrical and conform to said casing, and a plurality of recessed portions recessed from said casing, and each recessed portion is part of a contaminant channel extending to a corresponding peripheral contaminant outlet.

6. The invention of claim 2 wherein said fuel flow path includes radially inward flow of fuel through said first filter media and said peripheral contaminant outlet provides prefiltering contaminant removal.

7. The invention of claim 6 wherein said first filter media is a coalescing media and further comprising a second filter media inside said central fuel chamber, and said second filter media is a barrier media.

8. The invention of claim 1 wherein said casing includes a bottom, and said contaminant channel extends between said end cap and said bottom.

9. The invention of claim 6 wherein said casing is cylindrical, said end cap includes a plurality of peripheral portions which are cylindrical and conform to said casing, and a plurality of recessed portions recessed from said casing and each recessed portion is part of a corresponding contaminant channel extending to a corresponding peripheral contaminant outlet.

10. The invention of claim 1 wherein said filter unit is operable to provide prefiltering contaminant removal for outside-in flow and inside-out flow.

11. An invention comprising a fuel filter unit including:
    (a) a casing having first and second fuel ports to define a radially inward fuel flow path through said filter unit;
    (b) a first filter media disposed in a closed loop within said casing and separating a central fuel chamber from a peripheral fuel chamber, said peripheral fuel chamber disposed directly between said first filter media and said casing, said first filter media disposed intermediate said first and said second fuel ports in said fuel flow path, said fuel flow path includes radially inward flow of fuel through said first filter media;
    (c) a plurality of peripheral contaminant outlets operable to allow prefiltering removal of contaminants directly from said peripheral fuel chamber; and
    (d) a central contaminant outlet operable to allow contaminants to directly pass from said central fuel chamber, and
wherein said filter unit further includes an end cap having a plurality of contaminant channels extending radially inwardly therethrough towards said central contaminant outlet, each of said inwardly extending contaminant channels connecting said peripheral fuel chamber to an associated peripheral contaminant outlet.

12. The invention of claim 11 wherein said casing is cylindrical, said end cap includes cylindrical peripheral portions conforming to said casing and recessed portions recessed from said casing, and each recessed portion is part of a contaminant channel extending to a corresponding peripheral contaminant outlet.

13. The invention of claim 11 further comprising a contaminant collection bowl supported by said filter unit and releasably engaged to said filter unit, said collection bowl having separate first and second collection zones, said first collection zone disposed to collect liquid contaminants from said peripheral contaminant outlets as fuel passes through said filter unit, and said second collection zone disposed to collect liquid contaminants from said central contaminant outlet as fuel passes through said filter unit.

14. The invention of claim 13 wherein, in operation, said first and second collection zones are completely walled off from each other with the only communication between said first and second collection zones being through said filter unit by way of said central contaminant outlet and said first filter media.

15. The invention of claim 11 wherein said first filter media is a coalescing media and further comprising a second filter media inside said central fuel chamber, and said second filter media is a barrier or coalescing media.

16. An invention comprising a fuel filter end cap having a central contaminant outlet and at least one contaminant channel extending radially inward from a periphery of said end cap, said end cap operable to secure a first filter media disposed in a closed loop within a casing such that said central contaminant outlet allows passage of contaminants from within the first filter media and said contaminant channel allows passage of contaminants from outside of the first filter media, said end cap being operable to provide prefiltering contaminant drainage for outside-in fuel flow and inside-out fuel flow, and wherein said end cap includes a plurality of like-constructed contaminant channels extending radially inward from the periphery of said end cap towards said central contaminant outlet.

17. The invention of claim 16 wherein said end cap has cylindrical peripheral portions of a common radius centered at the center of said central contaminant outlet and recessed portions in between adjacent cylindrical peripheral portions, said recessed portions being closed to said center than said cylindrical portions are.

18. The invention of claim 17 wherein said end cap further includes relieved portions on a lower surface, said relieved portions constituting said contaminant channels.

19. The invention of claim 18 wherein said end cap is part of a fuel filter unit also including a casing having first and second fuel ports to define a fuel flow path through said filter unit and a first filter media disposed in a closed loop within said casing and separating a central fuel chamber from a peripheral fuel chamber, said peripheral fuel chamber disposed directly between said first filter media and said casing, said first filter media disposed intermediate said first and said second fuel ports in said fuel flow path; a central contaminant outlet to allow contaminants to exit from said central fuel chamber; and a plurality of peripheral contaminant outlets operable to allow contaminants to directly exit from said peripheral fuel chamber by way of said contaminant channels.

20. The invention of claim 19 wherein said casing includes a side wall and a bottom, and each contaminant channel extends between said end cap and said side wall and between said end cap and said bottom.

21. The invention of claim 20 further comprising a contaminant collection bowl supported by said filter unit and releasably engaged to said filter unit, said collection bowl having separate first and second collection zones, said first collection zone disposed to collect liquid contaminants from said peripheral contaminant outlet as fuel passes through said filter unit, said second collection zone disposed to collect liquid contaminants from said central contaminant outlet as fuel passes through said filter unit.

22. The invention of claim 16 wherein said end cap is part of a fuel filter unit also including a casing having first and second fuel ports to define a fuel flow path through said filter unit and a first filter media disposed in a closed loop within said casing and separating a central fuel chamber from a peripheral fuel chamber, said peripheral fuel chamber disposed directly between said first filter media and said casing, said first filter media disposed intermediate said first and said second fuel ports in said fuel flow path; a central contaminant outlet to allow contaminants to exit from said central fuel chamber; and a plurality of peripheral contaminant outlets operable to allow contaminants to directly drain from said peripheral fuel chamber by way of said contaminant channels.

23. The invention of claim 22 further comprising a contaminant collection bowl supported by said filter unit and releasably engaged to said filter unit, said collection bowl having separate first and second collection zones, said first collection zone disposed to collect liquid contaminants from said peripheral contaminant outlet as fuel passes through said filter unit, said second collection zone disposed to collect liquid contaminants from said central contaminant outlet as fuel passes through said filter unit.

* * * * *

UNITED STATES PATENT AND TRADEMARK OFFICE
CERTIFICATE OF CORRECTION

PATENT NO. : 4,626,348
DATED : December 2, 1986
INVENTOR(S) : Walter H. Stone

It is certified that error appears in the above-identified patent and that said Letters Patent is hereby corrected as shown below:

Column 10, line 27, Claim 17, "closed" should be --closer--.

Signed and Sealed this

Tenth Day of February, 1987

Attest:

DONALD J. QUIGG

Attesting Officer

Commissioner of Patents and Trademarks